(12) United States Patent
Bürkle et al.

(10) Patent No.: US 11,867,545 B2
(45) Date of Patent: Jan. 9, 2024

(54) TIME OF FLIGHT DETECTING METHOD FOR A PHASE SHIFTED SIGNAL TRAIN INCLUDING A SEQUENCE OF WAVES INSERTED BETWEEN A FIRST GROUP AND A SECOND GROUP

(71) Applicant: Sciosense B.V., AE Eindhoven (NL)

(72) Inventors: Matthias Bürkle, Eindhoven (NL); Stefan Kern, Eindhoven (NL); Augustin Braun, Eindhoven (NL)

(73) Assignee: Sciosense B.V., AE Eindhoven (NL)

( * ) Notice: Subject to any disclaimer, the term of this patent is extended or adjusted under 35 U.S.C. 154(b) by 175 days.

(21) Appl. No.: 17/294,995

(22) PCT Filed: Nov. 20, 2019

(86) PCT No.: PCT/EP2019/081936
§ 371 (c)(1),
(2) Date: May 18, 2021

(87) PCT Pub. No.: WO2020/104529
PCT Pub. Date: May 28, 2020

(65) Prior Publication Data
US 2022/0011144 A1    Jan. 13, 2022

(30) Foreign Application Priority Data
Nov. 20, 2018    (EP) .................................. 18207376

(51) Int. Cl.
*G01F 1/66*    (2022.01)
*G01F 1/667*    (2022.01)
*G01P 5/24*    (2006.01)

(52) U.S. Cl.
CPC .............. *G01F 1/667* (2013.01); *G01F 1/662* (2013.01); *G01P 5/245* (2013.01)

(58) Field of Classification Search
None
See application file for complete search history.

(56) References Cited

U.S. PATENT DOCUMENTS

| 4,527,433 A | 7/1985 | Gutterman |
| 5,753,824 A | 5/1998 | Fletcher-Haynes |
| (Continued) | | |

FOREIGN PATENT DOCUMENTS

DE    69933910 T2    5/2007

OTHER PUBLICATIONS

ACAM Member of the AMS Group, "Ultrasonic-Flow-Converter Data Sheet," TDC-GP30Y System-Integrated Solution for Ultrasonic Flow Meters, vol. 3: User Manual; Document-No. DB_GP30Y_Vol3_en V0.0, Aug. 13, 2015, 50 pages.

(Continued)

*Primary Examiner* — Harshad R Patel
(74) *Attorney, Agent, or Firm* — Slater Matsil, LLP (57) ABSTRACT

In an embodiment a method includes transmitting a signal train through a medium, wherein the signal train includes a sequence of waves of a first group and of a second group, the first and second groups being shifted in a time domain according to a predetermined phase shift, receiving the signal train as a received signal train and as a function of time, detecting a phase shift in the received signal train, assigning wave periods of the received signal train to respective wave periods of the first group using the detected phase shift as reference and determining a sequence of time-of-flight signals from the sequence of waves of the first group and the assigned wave periods of the received signal train, respectively.

14 Claims, 6 Drawing Sheets

(56) References Cited

U.S. PATENT DOCUMENTS

| | | | |
|---|---|---|---|
| 6,634,240 B1 | 10/2003 | Wallen | |
| 8,224,621 B2 * | 7/2012 | Ajay | G01F 1/667 |
| | | | 702/179 |
| 2008/0223147 A1 | 9/2008 | Deutscher et al. | |
| 2013/0076560 A1 * | 3/2013 | Edvardsson | G01F 23/284 |
| | | | 342/124 |
| 2016/0153821 A1 | 6/2016 | Nilsson et al. | |
| 2017/0115388 A1 | 4/2017 | Sathyanarayana et al. | |
| 2017/0329013 A1 | 11/2017 | Halmos | |

OTHER PUBLICATIONS

F. Gueuning et al., "Accurate distance measurement by an autonomous ultrasonic system combining time-of-flight and phaseshift methods," IEEE Transaction on Instrumentation and Measurement, vol. 46, No. 6, Dec. 1997, 5 pages.

Y. Duan et al., "A Method for Reducing the Static Drift of the Time Difference Method Ultrasonic Flowmeter," Microelectronics & Computer, vol. 27, No. 8, Aug. 2010, 5 pages.

* cited by examiner

TIME OF FLIGHT DETECTING METHOD FOR A PHASE SHIFTED SIGNAL TRAIN INCLUDING A SEQUENCE OF WAVES INSERTED BETWEEN A FIRST GROUP AND A SECOND GROUP

This patent application is a national phase filing under section 371 of PCT/EP2019/081936, filed Nov. 20, 2019, which claims the priority of European patent application 18207376.7, filed Nov. 20, 2018, each of which is incorporated herein by reference in its entirety.

TECHNICAL FIELD

The invention relates to a method of detecting a time-of-flight, a time-of-flight converter, an ultrasound flow meter and an optical device.

BACKGROUND

One field of application is ultrasonic flow metering using the transit time or time-of-flight, TOF, method. TOF can be used to measure various parameters such as flow velocities, flow rates and heat flow volumes of fluids and gases. Ultrasound flow meters based on TOF find various applications in industry and legal metering such as secure detection of an ultrasonic wave, for example. Furthermore, TOF can also be used in optical applications including infrared, IR, visible light, Vis, and ultra violet, UV, radiation. Optical TOF can be used for distance measurements and 3D-imaging, for example.

Ultrasonic flow meters measure flow through a medium such as a gas or a fluid. The measurement principle relies on comparing the TOF of ultrasonic signals which have been induced into a measurement volume along an upstream and a downstream direction of the flow. In order to achieve accurate TOF readings separate TOF measurements should relate to a robust reference in order to allow reliable comparison. Typically, zero crossings of the received signals are evaluated. In common applications, the received signals feature several wave periods and zero crossings. Thus, a stable and repeatable measurement typically evaluates a well-defined subset of the zero crossing points, at a same relative position within the received signal.

In more detail, information about flow velocity is comprised in the transit time of the ultrasound signal trains, e.g. pulse trains, and is extracted by comparing the transit times measured in upstream and downstream direction of the measurement volume, e.g. in a pipe. To compare the transit times, a reference position in the signal train is defined. An ultrasound signal train is influenced by temperature, flow speed, fluid pressure, fluid mixture and design of the measurement setup, e.g. inline setup. The measurement should be stable over a defined range of the listed parameters and the life-time of the system.

The first detected zero crossing typically triggers the so-called first hit. Established methods in ultrasonic flow meter applications include: The first hit level, the time delay trigger and the correlation method. Each method has its own difficulties. The first hit level relies on defining a fixed first hit position by using a zero crossing point after some received amplitude threshold level, the so-called first hit level, FHL, was reached. However, this method lacks robustness against changes in the wave train amplitude. The time delay trigger uses an adjustable time delay to mask undesired earlier zero crossings. This method needs a complex calculation to track the wave train upstream and downstream. Both methods are used in flow meter applications with a relatively low power consumption compared to other flow measurement techniques. The third variant, the correlation method, is widely-used but has a high power consumption which is an obstacle in battery powered devices like domestic flow meters.

SUMMARY

Embodiments provide a method for detecting a time-of-flight, a time-of-flight converter, an ultrasound flow meter and an optical device which allow for robust time-of-flight measurement.

It is to be understood that any feature described hereinafter in relation to any one embodiment may be used alone, or in combination with other features described hereinafter, and may also be used in combination with one or more features of any other of the embodiments, or any combination of any other of the embodiments, unless explicitly described as an alternative. Furthermore, equivalents and modifications not described below may also be employed without departing from the scope of the method of detecting a time-of-flight, the time-of-flight converter, the ultrasound flow meter and the optical device as defined in the accompanying claims.

The following relates to an improved concept in the field of time-of-flight, TOF, detection. The improved concept employs ways to establish a robust and stable reference for TOF detection, e.g. in ultrasound flow meters or optical devices. For example, a phase shift is added to a transmitted signal, e.g. a fire pulse train. The improved concept allows for determining the relative position of wave periods, e.g. represented by zero crossings, such as the first hit, within the received signal train, e.g. a received burst, by detecting the added phase shift as reference marker. The phase shift is present in the time domain and stays at the same relative position in time within the received signal train. Detection of the phase shift is more stable against external influences than the amplitude of the receiving wave. Such influences include changes in the absorption properties of the medium through which the transmitted and received signal trains travel, such as gas or fluid. Further examples include changes in the fluid flow rate or in the operational characteristics of the source used to generate the fire pulse train, e.g. an ultrasonic generator or receiver, caused by aging. Thus, an absolute amplitude, e.g. of a proportional electrical signal, of a received signal train could change to a level where it becomes possible to detect one of several crossing points or even no crossings at all.

The phase shift can be set between 0° and 180°, e.g. around 900 to reach a shift in time without interfering with the signal trains too much. The phase shift can be detected by a means of a timing block, comprising a time-of-flight converter, for example. It is possible to suggest where a first hit should be set within the received pulse train by assigning wave periods with respect to the phase shift and their expected appearance in the received signal train. However, phase shift detection can also be used as an additional safety margin together with first hit level and/or time trigger detection methods. For example, the time-of-flight converter can be configured to recalculate time-of-flight signals with reference to the phase shift in order to come up with improved or corrected time values. In fact, in case a jump of a first hit occurs during the cause of the measurements, it can be visualized in calculated phase shift times and a TOF sum can be corrected accordingly.

In at least one embodiment a method of detecting a time-of-flight signal comprises the following steps. First, a signal train is transmitted through a medium. The transmitted signal train comprises a sequence of waves, or wave periods, of a first group and waves, or wave periods, of a second group. The groups are shifted in the time domain according to a predetermined phase shift. The transmitted signal train is received as a received signal train and as a function of time. The transmitted signal train is altered through the medium and is considered the received signal train after traversing through the medium. The phase shift is detected in the received signal train. Then, wave periods of the received signal train are assigned to respective wave periods of the first group using the detected phase shift as reference. Finally, a sequence of time-of-flight signals is determined from the sequence of waves of the first group and the assigned wave periods of the received signal train, respectively.

The medium comprises a liquid or gas, for example. The phase shift can be considered a relative displacement between two consecutive wave periods or features thereof, e.g. peaks or zero crossings. Thus, the sequence of waves of the first group and of the second group can be considered separated in time. The separation is determined by the phase shift. For example, a last wave period of the first group occurs at a certain point in time and a first wave period of the second group occurs at a certain different point in time. These points in time are separated in time according to the phase shift. In some embodiments the wave periods of the first group may not overlap with the wave periods of the second group. Generally, however, the first and second groups are interchangeable, i.e. assigning wave periods of the received signal train to respective wave periods of the first group using the detected phase shift as reference is a question of nomenclature.

The transmitted signal train traverses through the medium and is altered depending on material properties of the medium, e.g. as a result of the Doppler effect. Thus, the wave periods of the received signal train may have different shape or waveform. Nonetheless, the wave periods of the received signal train have a corresponding counterpart wave period in the transmitted signal train. Thus, wave periods of the first group and wave periods of the second group can be identified with their counterparts in the received signal train. In fact, the phase shift stays at the same relative position in time and, thus, can be detected in the received signal train. In this sense wave periods of the received signal train can be assigned to respective wave periods of the first group using the detected phase shift as reference.

For example, a transmitted signal train has five wave periods in the first group followed by three wave periods in the second group. Thus, when the phase shift is detected it serves as a reference marker to identify the wave periods in the received signal train. In this example, the received wave periods before the phase shift can be assigned to the first group wave periods and the received wave periods after the phase shift can be assigned to the second group wave periods. Both the transmitted signal train and the received signal train are functions of time. The time dependence is employed to construct the sequence of time-of-flight signals from the sequence of waves of the first group and the assigned wave periods of the received signal train, respectively.

The proposed concept is based on time-domain measurements. Using the phase shift as reference marker in time has proven to be more robust than using pre-defined amplitude levels as reference. Optical and ultrasound systems are affected by external influences such as temperature, air bubbles, flow speed, fluid pressure, fluid mixture and design of the measurement setup. Thus, the proposed method of detecting a time-of-flight signal is more stable over a defined range of the listed parameters and the life-time of the system. For example, an ultrasonic transducer or spool piece features high stability in the time-domain, whereas a physical quantity like a voltage level, i.e. amplitude of the received signal train, is influenced by various physical parameters in the system. It requires a large effort for voltage level based detection methods to make sure that the flow meter system is stable over the entire parameter range and operating time until recalibration or end of life-time.

In at least one embodiment the phase shift is inserted between the first group and the second group such that the first group of waves is transmitted earlier in time than the second group of waves. For example, the phase shift is inserted after a number of wave periods of the first group, e.g. at the end of it. The phase shift may cover a quarter of a period time of the first group of wave periods. Put differently, the phase shift can be set between 0° and 180°. The phase shift may be set around 90° to reach the highest time shift without interfering the transmitted wave periods too much.

In at least one embodiment the wave periods of the transmitted signal train are registered with a first index, respectively. The first indices are representative of a chronological order of transmission of the wave periods, respectively. The wave periods of the received signal train are registered with a second index, respectively. The second indices are representative of a chronological order of reception of the wave periods, respectively. Then, pairs of transmitted wave periods and received wave periods are created having first indices corresponding to second indices. The sequence of time-of-flight signals is then determined from the created pairs. Finally, a physical parameter is calculated from the time-of-flight signals of the sequence of time-of-flight signals.

The indices allow for pairwise determination of time-of-flight signals, i.e. a time-of-flight can be determined between transmission of a given wave period and reception of the same wave period, but after it traversed through the medium. This facilitates correct assignment of wave periods of the received signal train to respective wave periods of the first group. Registering may be implemented using data registers which save the timing signals using the respective first and second indices. This way later data processing, such as correction of the sequence of time-of-flight signals, is possible at a device basis.

In at least one embodiment a time reference signal is issued together with transmitting the transmitted signal train. A number of timing signals are generated and are representative of a time of arrival of received wave periods, respectively. Generating the timing signals is triggered when a trigger condition is met. The sequence of time-of-flight signals is determined from the timing signals and with respect to the time reference signal.

The time reference signal serves as a time reference such as a start signal, i.e. the time reference signal may be issued as a start signal when a signal train is first transmitted or may be issued when each wave period is transmitted. For example, if the transmitted signal train comprises a number of electrical pulses the time reference signal may be issued when a predetermined pulse or pulse edge is generated, e.g. when the first pulse of a given pulse train is generated. Then, an arrival event of the corresponding received wave period may constitute a stop, such that the timing signals are indicative of the arrival time in terms of the time reference signal. Thus, the timing signals can be registered with the same indices introduced above, for example. The trigger condition is set as a marker for the recording of timing signals. If set correctly, the trigger condition prevents that artefact signals such as background noise are registered as timing signal. False triggering may otherwise reduce accuracy of the time-of-flight detection.

In at least one embodiment the trigger condition is met when a first wave period has reached a predetermined trigger signal level. In addition, or alternatively, the trigger condition is met when a predetermined trigger delay time has lapsed.

Both alternatives seek at determining a stable first hit detection. The predetermined trigger delay time essentially masks undesired earlier received signals or wave periods. The delay time may be adjustable using practical experience or knowledge of a system which is used to apply the method of detecting a time-of-flight signal, e.g. a time-of-flight converter. For example, the delay time may be adjusted by a user to yield robust first hit detection. Furthermore, the delay time may be adjusted in view of the detected phase shift. In this case the delay time can be set to a value which is sufficient to detect a first, a second etc. wave period in the received signal train, for example. The predetermined trigger signal level defines a fixed first hit position by using a next wave period, such as next zero crossing point, after some receive amplitude threshold level was reached. This condition is referred to as first hit level, FHL.

In at least one embodiment the timing signals are generated as digital time stamps using time-to-digital conversion. The phase shift is detected in the time domain by evaluating the digital time stamps.

Time-to-digital conversion provides a means for recognizing events and providing a digital representation of the time at which events occurred. For example, as a result of the conversion the digital time stamps are generated as the time of arrival for each incoming wave period, or pulse. In some embodiments the digital time stamps indicate a time interval between issuing the time reference signal, e.g. as start event, and receiving a wave period in the received signal train, e.g. as stop event. Furthermore, the digital time stamps can be registered using the indices introduced above. Time-to-digital conversion can be realized by time-to-digital converters, TDCs, which measure time intervals from zero to the millisecond range at a resolution of better than 1 to 10 ps. TDCs can be integrated thus allowing for a compact on-chip solution.

In at least one embodiment a first timing signal is defined as a first time of arrival of the wave period being received first in time after the trigger condition has been met. This first timing signal is denoted as first hit. Then, a predicted first hit is determined from the detected phase shift.

The first hit detection may not always be correct and may be prone to false detection. For example, depending on the trigger condition a wave period which should be considered first hit may not be detected. This may occur when a corresponding amplitude of said wave period is altered so that it does not meet the predetermined trigger signal level to trigger detection, for example. Especially amplitudes are influenced by temperature, bubbles in the medium, flow speed, fluid pressure, fluid mixture and design of the measurement setup. Another situation which may lead to false detection is setting a too large trigger delay time. In this case detection may start after a wave period which should be considered first hit has already been detected, e.g. by means of the transducer.

The detected phase shift defines the relative positions of wave periods, i.e. relative position in time. This provides additional system knowledge as the received wave periods can be identified and assigned to respective transmitted wave periods, e.g. using the indexing discussed above. This is possible as the succession and number of wave periods of the first and second group can be defined by the user and, thus, is known. In turn, the detected phase shift provides a means to predict a relative position of the first hit and evaluate whether the detected first hit corresponds to the predicted first hit and its position in time.

In at least one embodiment, in case the first hit and predicted hit have a same time of arrival, the method proceeds with calculating a physical parameter from the sequence of time-of-flight signals. In case the first hit and the predicted first hit have different times of arrival, the method proceeds with correcting the sequence of time-of-flight signals using the predicted first hit as first hit. In addition or alternatively a new measurement is started over again, beginning with transmitting the signal train again. Furthermore, in case the first hit and predicted first hit have different times of arrival, the method proceeds with adjusting the trigger condition such that the first hit corresponds to the wave period of the received signal train registered first in chronological order of reception.

In at least one embodiment the sequence of time-of-flight signals is determined during a first measurement cycle. At least another sequence of time-of-flight signals is determined during a second measurement cycle. Finally, the physical parameter is determined from the sequences of time-of-flight signals of both first and second measurement cycles.

The first measurement cycle and the second measurement cycle may be used to implement a differential or a comparative measurement concept. For example, ultrasonic flow meters measure flow by comparing the time-of-flight upstream and downstream. The phase shift is more stable than an amplitude-based method, for example, and can be used as a reference marker. Consequently, a comparison of consecutive measurements, e.g. the sequences of time-of-flight signals of both first and second measurement cycles, can be compared with a higher degree of accuracy as well. Furthermore, physical parameters determined from a differential or a comparative measurement concept, such as a flow velocity, can be determined with a higher degree of accuracy as well.

In at least one embodiment the transmitted and received signal trains comprise wave periods of electromagnetic radiation, such as visible, infrared or UV light. At least some embodiments comprise sound wave periods or ultrasound wave periods. Thus, the proposed concept can be applied using different types of radiation. One use case is for ultrasonic flow measurement based on the transit-time method also known as time-of-flight method discussed above. Another use case is for other time-of-flight applications such as optical distance measurements or surface scanning. In order to achieve a sufficient temporal resolution, e.g. for time-to-digital conversion, the succession of wave periods or pulses could be adjusted accordingly. State of the art time-to-digital converters provide resolution in the range of some ns to ps.

In at least one embodiment a time-of-flight converter comprises a transmitter frontend with at least one output terminal to connect at least one transducer. The time-of-flight converter further comprises a timing register block with at least one input terminal to receive an input signal as a function of time. For example, the input terminal is configured to be connected to the at least one transducer. This way the same transducer can be used for both transmission and reception. Alternatively, the input terminal can be configured to be connected to another transducer. This way a two transducer setup can be implemented, e.g. with one transducer transmitting and one transducer receiving. In some embodiments the role of transmitting and receiving transducers can be exchanged, e.g. during different measurement cycles such that both transducers can be used for both transmission and reception in an alternating fashion, for example. A processing unit is connected to the timing register block and configured to receive the input signal. In general terms, the processing unit is configured for signal processing of the input signal as will be discussed below. However, further functions can be assigned to the processing unit, such as to manage timing and interaction of the other units during operation, e.g. as a control unit.

In an operating state the time-of-flight converter may be connected to one or more transducers as discussed above. The transmitter frontend generates an output signal which drives the at least one transducer to transmit a signal train through a medium. The transmitted signal train comprises a sequence of waves of a first group and of a second group. The groups are shifted in the time domain according to a predetermined phase shift. The transmitter frontend generates the output signal, and, thus, the transmitted signal train, comprising the first group and the second group, and inserts the phase shift in order to separate the two groups in time.

After being transmitted through the medium the transmitted signal train eventually can be detected by the time-of-flight converter, e.g. by means of the same transducer(s) or by means of another transducer. Then the transmitted signal train is denoted received signal train. In any case, the transducer that detects the received signal train generates the input signal. The timing register block receives the input signal via the at least one input terminal and as a function of time. The processing unit detects a phase shift in the input signal. Furthermore, the processing unit detects whether the detected phase shift corresponds to the predetermined phase shift. Then wave periods of the input signal are assigned to respective wave periods of the first group using the detected phase shift as reference.

For example, consider the first group comprises a number of wave periods before the phase shift and the second group comprises another number of wave periods after the phase shift. By detecting the phase shift in the input signal the wave periods can be identified and assigned to each other. The processing unit is further configured to determine a sequence of time-of-flight signals from the sequence of waves of the first group and the assigned wave periods of the received input signal, respectively.

The proposed time-of-flight converter allows for time-domain measurements of time-of-flight, e.g. in a flow meter or optical TOF. Using the phase shift as reference marker in time has proven to be more robust than using pre-defined amplitude levels as reference. The phase shift added to output signal generates a reference position that can be used for dereferencing a start position for determining TOF times. Optical and ultrasound systems are affected by external influences such as temperature, flow speed, fluid pressure, fluid mixture and design of the measurement setup. Thus, the proposed time-of-flight converter is more stable over a defined range of the listed parameters and the life-time of the system. For example, an ultrasonic transducer or spool piece features a high stability in the time-domain. Whereas a physical quantity like a voltage level, e.g. an amplitude of the received signal train, is influenced by more physical parameters in the system. It requires a considerable effort for voltage level based detection methods to make sure that detection system, such as the flow meter system works, properly over the entire parameter range and operating time, e.g. until recalibration or end of life-time. Furthermore, improved stability is combined with a low power consumption compared to other time-of-flight concepts, e.g. other flow measurement techniques. Thus, the proposed time-of-flight converter can be used mobile device or in battery powered devices like domestic or industry flow meters.

In at least one embodiment the transmitter frontend comprises a configurable signal generator to generate the output signal. The signal generator is configured to receive control signals to adjust a waveform of the transmitted signal trains, and/or to adjust the number of wave periods of the first group of waves and/or the second group of waves, and/or to insert the phase shift between the first group and the second group of waves.

The signal generator generates electrical signals which form the output signal of the time-of-flight converter. The signal generator can be configured by means of the control signals which may be applied via respective control terminals to receive said control signals. Various waveforms, such as sinusoidal or non-sinusoidal waveforms, are possible in general. For example, the electrical signals may have pulse shape and comprise pulse trains of a finite number of electrical pulses. The signal generator can operate as an ultrasound source with frequencies from 20 kHz up to several MHz. In other embodiments the signal generator drives an optical transducer, e.g. a light source or sensor module, to emit in the IR, Vis, or UV spectrum. A control signal may, as an option, adjust a waveform of the output signal.

The output signal is transformed into a transmitted signal train, or pulse train, e.g. by means of the ultrasound or optical transducer. Consequently, the output signal and the transmitted signal train are split into a sequence of waves forming the first group and a sequence of waves forming the second group, e.g. a first group of pulses and a second group of pulses. The first group and the second group are shifted in the time domain according to the predetermined phase shift which is inserted depending on a configuration of the signal generator.

The signal generator is configured by the second control signal to define a value of the phase shift. For example, the phase shift is inserted between the first group and the second group of wave periods. Another control signal can be applied to adjust a pulse duration, a period, and a number of electrical wave periods. For example, the control signal determines a number of wave periods of the first group and a number of wave periods of the second group. Configuration of the signal generator allows for adjusting the time-of-flight converter to fit to the intended application. Furthermore, the configuration constitutes known information about the time-of-flight converter. For example, knowledge about the number of wave periods of the first group and the number of wave periods of the second group combined with the phase shift allows for assigning the respective wave periods in the received signal train or input signal to their transmitted wave period counterparts.

In at least one embodiment the transmitter frontend comprises a time reference generator which is configured to issue a time reference signal. A timing block, such as a time-to-digital converter, is configured to generate timing signals which are representative of a time of arrival of received wave periods, respectively. Generating the timing signals is triggered when the trigger condition is met. The processing unit is configured to determine the time-of-flight signals from the timing signals and with respect to the time reference signal.

The time reference signal serves as a time reference, such as a start signal, i.e. the time reference signal may be issued as a start signal when the output signal is generated. For example, the time reference signal may be issued when a predetermined pulse or pulse edge is generated. Then an arrival of a received wave period and corresponding input signal may constitute a stop signal such that the timing signals are indicative of the arrival time in terms of the time reference signal. The trigger condition is set as a marker for the recording of timing signals. If set correctly the trigger condition prevents that artefact signals such as background noise are registered as a timing signal. False triggering may reduce accuracy of the time-of-flight detection.

In at least one embodiment a signal level detector is configured to monitor a signal level of received wave periods and to issue a trigger signal to trigger the timing block when a first received wave period has reached a predetermined trigger signal level. Alternatively, or in addition, a timer is configured to issue the trigger signal to trigger the timing block when a predetermined trigger delay time has lapsed.

The predetermined trigger delay time essentially masks undesired earlier received signals or wave periods. The delay time may be adjustable using practical experience or knowledge system behavior, e.g. in a flowmeter or optical setup. For example, the delay time may be adjustable based on yet another control signal to yield robust first hit detection. Furthermore, the delay time may be adjusted in view of the detected phase shift. In this case the delay time can be set to a value which is sufficient to detect a first, a second etc. wave period in the input signal generate upon detection of received signal trains, for example. The predetermined trigger signal level can be used to define a first hit position by using a next wave period, such as next zero crossing point, after some receive amplitude threshold level was reached. This condition is referred to as first hit level, FHL. For example, the timing block may comprise a zero crossing detector to determine whether the input signal meets the predetermined trigger signal level. Such zero crossing detector may further comprise a control means to set and alter the predetermined trigger signal level, a comparator and an analyzer to determine a signal level of the input signal. Both predetermined trigger delay time and first hit level implementation provide relative low power consumption paired with reliable detection of time-of-flight signals.

In at least one embodiment an ultrasound flow meter comprises a time-of-flight converter according to the proposed concept above. At least one ultrasound transducer is configured to receive the output signal at the at least one output terminal and/or to provide the input signal at the at least one input terminal.

Ultrasonic flow meters measure flow by comparing the time of flight of an ultrasonic burst signal upstream and downstream. The time-of-flight converter allows for providing and analyzing signal trains with several wave periods or zero crossings. The time-of-flight converter provides for a stable and repeatable measurement as a well-defined subset of wave periods or zero crossing points can be identified based on the phase shift inserted into the output signal and thereby into the transmitted signal. For example, same relative positions of received wave periods can be assigned to corresponding transmitted wave periods thus creating signal pairs to determine a time-of-flight with high accuracy and repeatability. A first hit of received wave periods, e.g.
zero crossings, may trigger the first hit. The time-of-flight converter allows for keeping the first hit position stable at a fixed relative position of the receive signal trains.

The ultrasonic flow meter is based on time-domain measurements. The system behavior of an ultrasonic transducer features high stability in the time-domain, whereas a physical quantity, like a voltage level such as amplitude of the receiving signal, may be influenced by more physical parameters in the system. It requires a large effort for voltage level based detection methods to make sure that the flow meter system works properly over the entire parameter range and operating time until recalibration or end of life-time.

In at least one embodiment, the optical sensor device comprises a time-of-flight converter according to the proposed concept above. At least one optical transducer is configured to receive the output signal at the at least one output terminal and/or provide the input signal at the at least one input terminal.

The optical device essentially shares the benefits of the time-of-flight converter but is applied to a different type of radiation. For example, one use case is for other time-of-flight applications such as optical distance measurements or surface scanning. In order to achieve a sufficient temporal resolution, e.g. for time-to-digital conversion the succession of wave periods or pulses should be adjusted accordingly. State of the art time-to-digital converters provide resolution in the range of some μs to ps.

Further implementations of the time-of-flight converter, ultrasound flow meter and optical device are readily derived from the various implementations and embodiments of the method of detecting a time-of-flight and vice versa.

BRIEF DESCRIPTION OF THE DRAWINGS

In the following, the principle presented above is described in further detail with respect to drawings, in which exemplary embodiments are presented.

In the examples of embodiments and Figures below, similar or identical elements may each be provided with the same reference numerals. The elements illustrated in the drawings and their size relationships among one another, however, should not be regarded as true to scale. Rather individual elements, such as layers, components, and regions, may be exaggerated to enable better illustration or improved understanding.

DETAILED DESCRIPTION OF ILLUSTRATIVE EMBODIMENTS

Figure 1A:
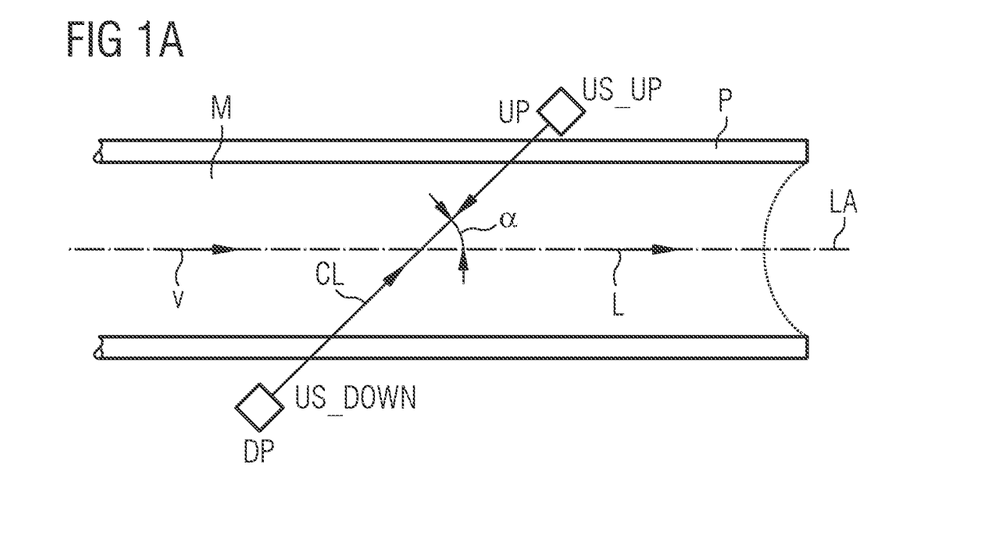
FIG. 1A shows an example flow measurement setup.
Figure 1B:
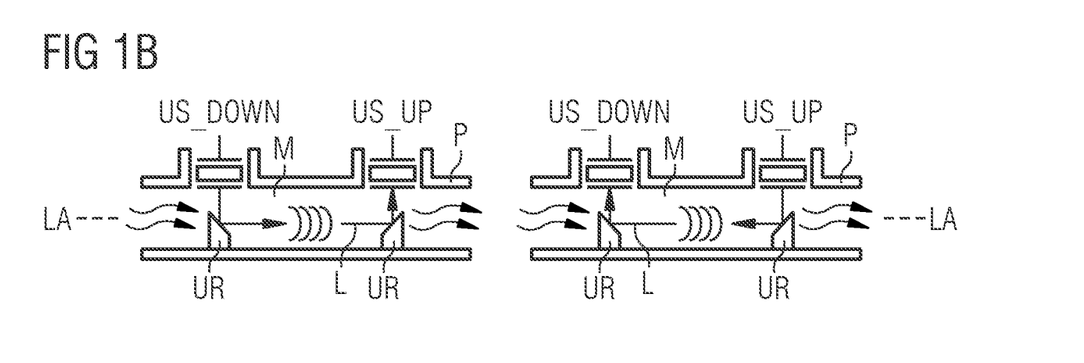
FIG. 1B shows another example flow measurement setup.

FIGS. 1A and 1B show example flow measurement setups. The setups depicted in the drawings constitute ultrasound flow meters to measure a flow of a medium M, such as fluids or gases, along a pipe P. In the setup of FIG. 1A two ultrasound transducers US_DOWN, US_UP are positioned in a downstream position DP and in an upstream position UP, respectively. A connecting line CL, connecting the two ultrasound transducers US_DOWN, US_UP, has an inclination angle α with respect to a longitudinal axis LA of the pipe P. In the setup of FIG. 1B the two ultrasound transducers US_DOWN, US_UP are also positioned in the downstream position DP and in the upstream position UP but parallel, or inline, with the longitudinal axis LA of the pipe P. In the embodiment of FIG. 1B the inclination angle α is zero. In order to couple ultrasound into and out of the pipe P two ultrasound reflectors UR are positioned inside the pipe. The two ultrasound reflectors UR establish a U-shaped signal path connecting the two ultrasound transducers US_DOWN, US_UP.

Two ultrasound transducers US_UP, US_DOWN are configured as transceivers, i.e. they can both transmit and receive ultrasound. For example, the ultrasound transducers comprise piezoelectric crystals. The two transducers US_UP, US_DOWN are connected to a time-of-flight converter TOFC (not shown) which is configured to drive the transducers to transmit and/or receive ultrasound waves. For example, piezoelectric crystals are used as transducers of ultrasound waves.

In a typical measurement the piezoelectric transducers alternately energized with an output signal of the time-of-flight converter TOFC and ultrasonic pulse signals are sent alternately through the pipe P which is filled with a flowing medium M to be measured. The piezoelectric transducers do not emit a single pulse when energized with the output signal of the time-of-flight converter TOFC, such as a single or a finite number of electrical pulses. Rather the crystal is caused to oscillate at a characteristic resonant frequency to emit a train of wave periods, considered a transmitted signal train TS hereinafter, which will be discussed in further detail below.

In a first measurement cycle, or first phase, the transmitted signal train TS is sent from the transducer upstream US_UP, to transmit a first signal train TS_DOWN, and is received as a received signal train by the transducer downstream US_DOWN. The result of this measurement is a first received signal train RS_DOWN as a function of time, e.g. represented by a number of digital time stamps. An evaluation of the first received signal train RS_DOWN results in a first sequence of time-of-flight signals TOF_DOWN representing the time-of-flight of the downstream measurement.

In a next measurement cycle, or second phase, the direction of the measurement is reversed. Thus, the transmitted signal train TS is sent from the transducer downstream US_DOWN to transmit a second signal train TS_UP, and is received as a received signal train by the transducer upstream US_UP. The result of this measurement is a second received signal train RS_UP as a function of time, e.g. represented by a number of digital time stamps. An evaluation of the second received signal train RS_UP results in a second sequence of time-of-flight signals TOF_UP representing the time-of-flight of the upstream measurement. A further evaluation of the sequences TOF_UP and TOF_DOWN, e.g. based on a difference operation, is a measure of transit time through the medium M. In fact, the transit time is a function of flow of medium M through the pipe P and can be analyzed for physical parameters which characterize the flow.

For example, the sequences of time-of-flight signals TOF_UP and TOF_DOWN can be evaluated to yield as physical parameter an average fluid velocity v. For a given average fluid velocity v, a measurement path L, e.g. the length of the signal path between the two transducers US_UP, US_DOWN, and a sound velocity $c_0$ of an acoustic signal in medium M, a signal such as a transmitted signal train TS, needs a time $t_{up}$ for the upstream path (delay time upstream) and a time $t_{down}$ for the downstream path (delay time downstream). The respective times can be taken from the sequences of time-of-flight signals TOF_UP and TOF_DOWN. In terms of the parameters defined above, the delay time upstream and delay time downstream can be expressed as:

$$t_{up} = \frac{L}{c_0 + v \cdot \cos\alpha} \text{ and } t_{down} = \frac{L}{c_0 - v \cdot \cos\alpha}.$$

A transit time Δt, which can also be determined from the sequences of time-of-flight signals TOF_UP and TOF_DOWN, is a function of average fluid velocity v. The transit time is determined as the time difference of the delay times upstream and downstream. Thus, $$\Delta t = t_{down} - t_{up} = \frac{2 \cdot L \cdot v \cdot \cos\alpha}{c_0^2 - v^2 \cdot \cos^2\alpha} \approx \frac{2 \cdot L \cdot \cos\alpha}{c_0^2} \cdot v.$$

This expression can be solved for the average fluid velocity v which can be approximated as follows:

$$v \approx \frac{\Delta t \cdot c_0^2}{2 \cdot L \cdot \cos\alpha}.$$

This expression can be further simplified when using the inline setup discussed in FIG. 1B. As this setup has no inclination, or α=0, it follows that:

$$v \approx \frac{\Delta t \cdot c_0^2}{2 \cdot L}.$$

The computation of the average fluid velocity v can be performed by means of an external computation unit, such as an external microcontroller, which receives the sequences of time-of-flight signals TOF_UP and TOF_DOWN. However, the time-of-flight converter TOFC may comprise a computation unit on its own, e.g. the processing unit PU, which can be configured to also execute the processing of delay times and computation of transit times Δt and average fluid velocity v on the same chip.

Figure 2:
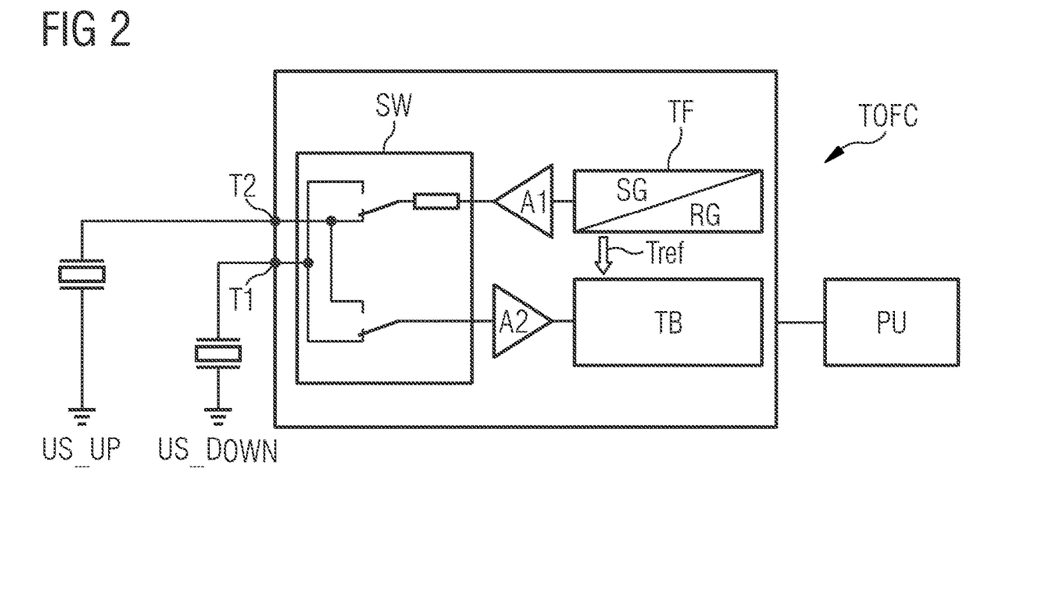
FIG. 2 shows an example embodiment of a time-of-flight converter.

FIG. 2 shows an example embodiment of a time-of-flight converter. The time-of-flight converter TOFC comprises a transmitter frontend TF, a timing register block RB, and a processing unit PU. All these components may in general be separate from each other or all or at least some of the components into a common integrated circuit, i.e. on the same chip.

The transmitter frontend TF comprises a first and/or a second output terminal T1, T2. For example, the first output terminal T1 can be connected to the transducer upstream US_UP and the second output terminal T2 can be connected to the transducer upstream US_DOWN. In some embodiments, however, the transmitter frontend TF features just a single output terminal T1. A single transducer can be used to detect both upstream and downstream, i.e. a single transducer can be used in changing configurations allowing for transmission and reception of signals.

The transmitter frontend TF comprises a configurable signal generator SG. The signal generator SG generates electrical signals which form the output signal of the time-of-flight converter TOFC. The signal generator SG can be configured by means of control signals which may be applied via respective control terminals (not shown) to receive said control signals. Various waveforms, such as sinusoidal or non-sinusoidal waveforms, are possible in general. Typically, the electrical signals have pulse shape and comprise pulse trains of a finite number of electrical pulses. The signal generator SG can operate with frequencies from 20 kHz up to several MHz, for example. A control signal may, as an option, adjust a waveform of the output signal.

Each transmitted signal train TS, or pulse train, is split into a sequence of waves forming a first group TS1 and a sequence of waves forming a second group TS2, e.g. a first group of pulses and a second group of pulses. The first group and the second group TS1, TS2 are shifted in the time domain according to a predetermined phase shift PS. A second control signal can be applied to define a value of the phase shift PS which is inserted in the output signal. The phase shift PS is inserted between the first group of pulses TS1 and the second group of pulses TS2, for example. Another control signal can be applied to adjust a pulse duration, period of pulses and/or a number of electrical pulses. For example, the control signal determines a number of pulses of the first group of pulses TS1 and a number of pulses of the second group of pulses TS2.

Furthermore, the transmitter frontend TF comprises a time reference generator RG which is coupled to the signal generator SG. The time reference generator RG is configured to issue a time reference signal Tref, for example a reference pulse with a defined digital time stamp. The time reference signal Tref may be issued as a start signal when an output signal is generated by the signal generator SG and a corresponding signal train TS is transmitted. For example, if the pulse trains comprise a number of electrical pulses the time reference signal Tref may be issued when a predetermined pulse or pulse edge is generated, e.g. when the first pulse of a given pulse train is generated.

An output side of the signal generator SG is connected via a first pre-amplifier A1 and switching network SW to the terminal T2. The terminal T1 is connected to the switching network SW and a second pre-amplifier A2 and further to a timing block TB. The transmitter frontend TF comprises the timing block TB which is connected to the time reference generator RG to receive the time reference signal Tref. The timing block TB comprises a time-to-digital converter and a register block. The timing block TB is connected to the processing unit PU. Furthermore, the timing block TB comprises one or more register blocks to save timing signals, e.g. together with corresponding indices. As a further component the time-of-flight converter TOFC may have a control unit (not shown). The control unit is configured to manage timing and interaction of the other units during operation. However, the control unit may also be part of the processing unit PU, for example.

During operation of the time-of-flight converter TOFC the signal generator SG transmits the output signal, e.g. of user-configured pulse count and frequency, via the switching network SW to one of the transducers US_DOWN, US_UP. The output signal is then converted into ultrasound radiation and is transmitted as the signal train TS, including wave periods of the first and the second groups TS1, TS2 being separated in time by the predetermined phase shift PS. At the same time, the time reference generator RG generates the time reference signal Tref, typically a pulse edge, for the timing block TB.

After traversing through the medium M, for example, the same, or other, transducer US_DOWN, US_UP detects the transmitted signal trains as received signal trains. The transducer US_DOWN, US_UP converts said signal trains into the input signal and provides said signal at the input terminal T2. As a consequence the timing block TB receives the input signal from the transducer, after it travelled through the medium M under test. The timing block TB then evaluates input signal to generate the timing signals, e.g. digital time stamps or as a number of hits, or pulse edges, from the analog input signal.

According to its configuration, a number of these pulse edges get assigned a corresponding time stamp, e.g. from repeated measurement cycles, which are collected and saved in the register block. After a later calculation the timing signals finally yield a sequence of time-of-flight signals TOF_UP, TOF_DOWN, in reference to the time reference signal Tref supplied by the time reference generator RG. This calculation can be performed by the processing unit PU and will be discussed in further detail below.

Figure 3:
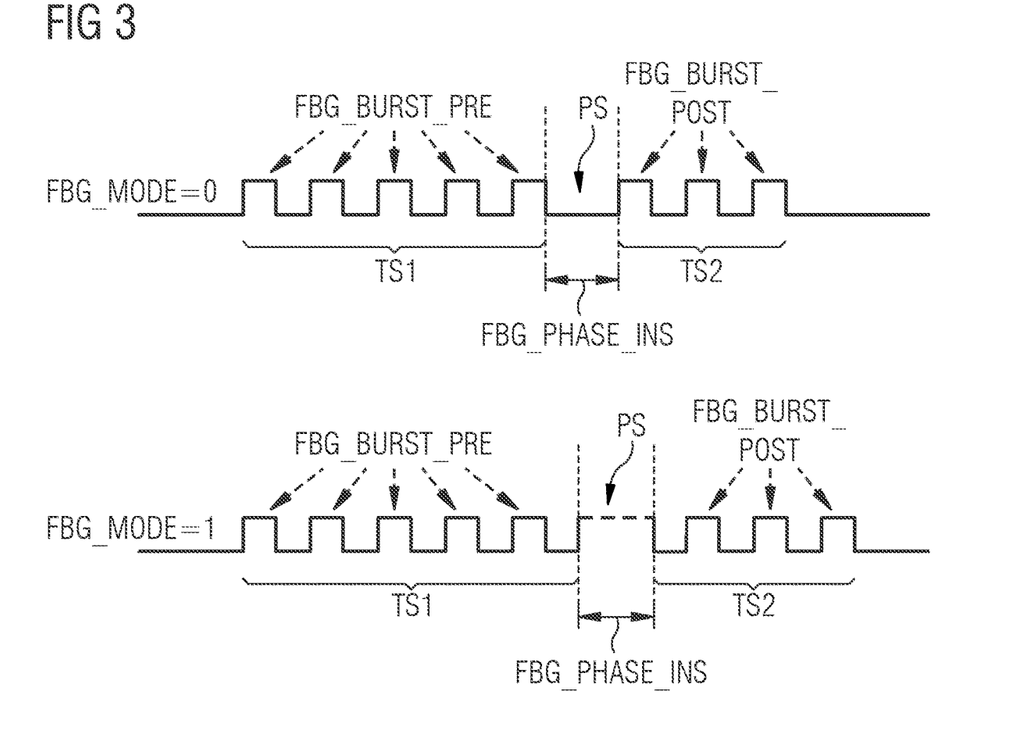
FIG. 3 shows an example of a transmitted signal train including a phase shift.

FIG. 3 shows an example of a transmitted signal train including a phase shift. As discussed above, the time-of-flight converter TOFC generates the output signal, e.g. having pulse trains of a finite number of electrical pulses. In turn, the transducer connected to the first and/or second output terminal T1, T2 transmits a signal train TS of ultrasound waves. The signal train TS is induced into and traverses through the medium M along the measurement path L. In other words, the output signal determines the functional shape of the transmitted signal train TS which consequently comprises a sequence of waves of a first group TS1 and a sequence of waves of a second group TS2. For many practical use cases the waves have pulse shape and the first and second groups TS1, TS2 each have a number of pulses as depicted in the drawing.

The groups TS1 and TS2 are shifted in the time domain according to the phase shift PS predetermined by means of the signal generator SG. The phase shift PS can be considered a relative displacement between two corresponding features, e.g. peaks or zero crossings, of two waveforms having the same frequency. In the drawing the phase shift PS is depicted as an offset in time between the occurrence of two consecutive pulses, e.g. a last pulse of the first group TS1 and a first pulse of the second group TS2. Typically, the phase shift PS is inserted between the first group TS1 and the second group TS2 such that the first group of pulses TS1 is transmitted earlier in time than the second group of pulses TS2. The pulses before the phase shift PS are denoted pre-burst pulses FBG_BURST_PRE and after the phase shift PS are denoted post-burst pulses FBG_BURST_POST. The number of pre-burst and post-burst pulses can be adjusted by means of the control signal applied to the signal generator SG. Typically, a number of pre-burst pulses is higher if these pulses are to be used to determine the sequence of time-of-flight signals. Then, a number of post-burst pulses is smaller and these pulses are used to determine the phase shift in the received signals. However, the post-burst pulses may also be used to determine the sequence of time-of-flight signals.

Basically, there are two variants to insert the phase shift PS into the transmitted signal train TS, e.g. after a defined number of pre-burst pulses FBG_BURST_PRE. These variants are depicted in the drawing as mode=0 and mode=1. In mode=0 the phase shift PS is inserted as a low-phase of the signal train. In mode=1 the phase shift PS is inserted as a high-phase of the signal train TS. The phase shift PS can be set between 0° and 180°. In order to reduce interference, the phase shift PS is set around 900 to reach the highest time shift without interfering the transmitted ultrasound waves too much. The degree of phase shift PS is set by means of the signal generator SG, i.e. by applying a corresponding control signal.

Figure 4:
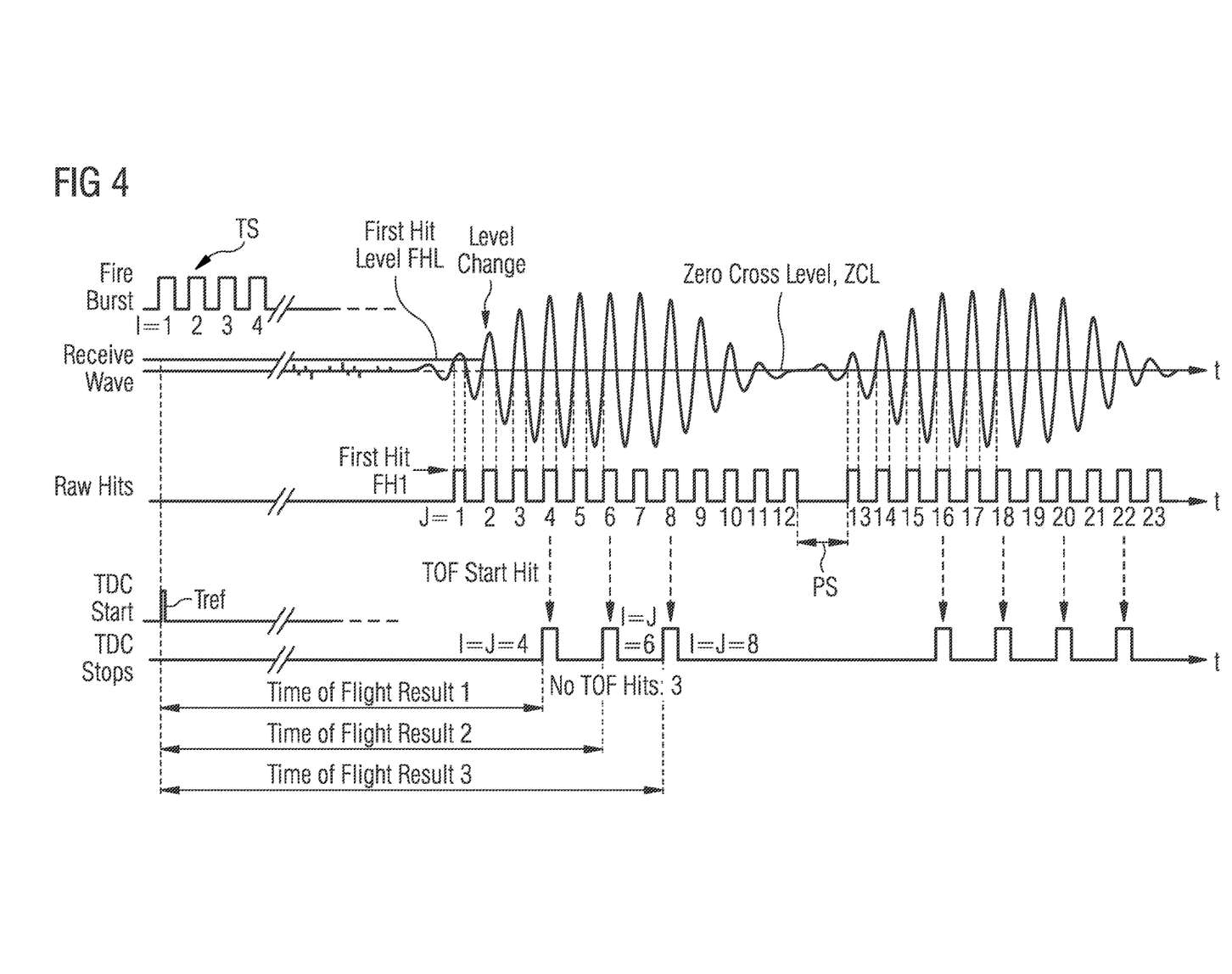
FIG. 4 shows an example timing scheme for time-of-flight detection.

FIG. 4 shows an example timing scheme for time-of-flight detection. The graphs in FIG. 4 are all functions of time t. Completing the scheme defines one measurement cycle or phase, e.g. for the upstream and downstream directions.

The first row of the drawing shows transmitted signal train TS as a function of time. The transmitted signal train TS, or fire burst, is only schematically indicated. Its properties derive from the more general concept discussed with respect to FIG. 3 above. The individual wave periods, or pulses, of the output signal generating the transmitted signal train TS are registered in the register block with a first index I which represents a chronological order of transmission of the wave periods, respectively.

The second row of the drawing shows a received signal train RS as a function of time. The received signal train RS comprises a number of wave periods of sinusoidal waveform. The fire burst of consecutive pulses, i.e. the transmitted signal train, is altered while traversing through the medium M. Typically, the waveform of wave periods is altered to have sinusoidal form. Nonetheless, wave periods of the received signal train, or received wave, can be assigned to respective wave periods, or pulses, of the fire burst or transmitted signal train TS. The wave periods of the received signal train RS oscillate around a zero cross level ZCL and are enclosed by a sinusoidal envelope. In fact, the received signal train RS comprises two groups of wave periods with first increasing amplitude, then typically some wave periods with a more or less constant maximum amplitude, and finally wave periods with decreasing amplitude. The peak amplitudes of the wave periods form the envelope function of the receive burst.

In order to conduct a time of flight measurement the received wave periods are assigned to corresponding transmitted wave periods, and then arrival times are determined, respectively. For this purpose a sequence of timing signals is determined as depicted in the third row of the drawing, denoted raw hits. These raw hits are determined by means of the timing block TB, for example. In this particular embodiment the timing signals are generated as digital time stamps using time-to-digital conversion by means of the timing block TB. For example, the first timing signal, or first hit FH1 corresponding to a first time of arrival of a received wave period, is detected when a predetermined trigger signal level has been reached (trigger condition). Then subsequent wave periods are counted from the first hit in chronological order, registered with a second index J, and both are stored in the register block.

The shown received signal train RS features a number of zero crossings, defined with respect to a zero cross level ZCL which is given by the measurement system, e.g. by means of a reference voltage of the internal comparator. Assigning of zero crossings to index J in an unambiguous manner makes use of the trigger signal level which can be considered a threshold voltage, for example. As shown in FIG. 4, the trigger signal level is applied before the received signal train RS appears as input signal of the time-of-flight converter TOFC. This triggers detection of a first timing signal after the trigger signal level is first exceeded by a received wave period. A digital signal edge shown as raw hit is generated by this event and denoted the first hit FH1 (as digital timing signal), and the corresponding received wave period denoted the first received wave period. After this event, the trigger signal level is not applied any longer but rather set to the zero cross level ZCL to generate further timing signals, e.g. as pulse edge signals at subsequent zero crossings, denoted hits hereinafter. The hits are registered in chronological order and in reference to the first hit using the second index J.

The phase shift PS inserted in the output signal is apparent in the input signal as well. For example, the received wave periods are separated in time into a first group and a second group of waves, too. In a space between the first and second group the received wave periods return to the zero cross level for a certain time duration, depending on the phase shift PS, as apparent from the drawing. In general, however, the received wave periods may not return to the zero cross level completely but may be apparent by smaller amplitudes in the envelope only. In this sense the graph depicted in the drawing is somewhat exaggerated. The phase shift PS is also apparent in the raw hits, i.e. in the sequence of timing signals and, thus, can be detected by evaluating the received wave periods using time-to-digital conversion, e.g. based on the digital time stamps as timing signals.

The detected phase shift PS serves as a reference marker to identify the wave periods in the received signal train RS and assign them to their corresponding transmitted wave periods. For example, pairs I=J of transmitted wave periods and received wave periods can be created having first indices I corresponding to second indices J. The received wave periods before the phase shift can be assigned to wave periods of the first group TS1 and the wave periods received after the phase shift can be assigned to wave periods of the second group TS2.

The fourth row of the drawing referenced as TDC Start shows the time reference signal Tref. The time reference signal Tref serves as a start signal for the timing block TB, e.g. the time-to-digital converter. The fifth row shows a sequence of time-of-flight signals TOF, referenced as TDC Stop. For example, the time-of-flight signals can be considered stop signals of the time-to-digital converter with respect to the time reference signal Tref. Consequently, the time-of-flight signals represent a time-of-flight of respective transmitted and received wave periods. The sequence of time-of-flight signals TOF depicted in the drawing is built from hits with J=4, 6, and 8. However, any other number of hits can be included in the TOF signal. Hits J=16, 18, 20, and 22 are used to determine the phase shift PS but could also be used for the TOF signal. The time-of-flight signals are built in reference to their wave period counterparts, e.g. I=4, 6, and 8 and so on.

Figure 5:
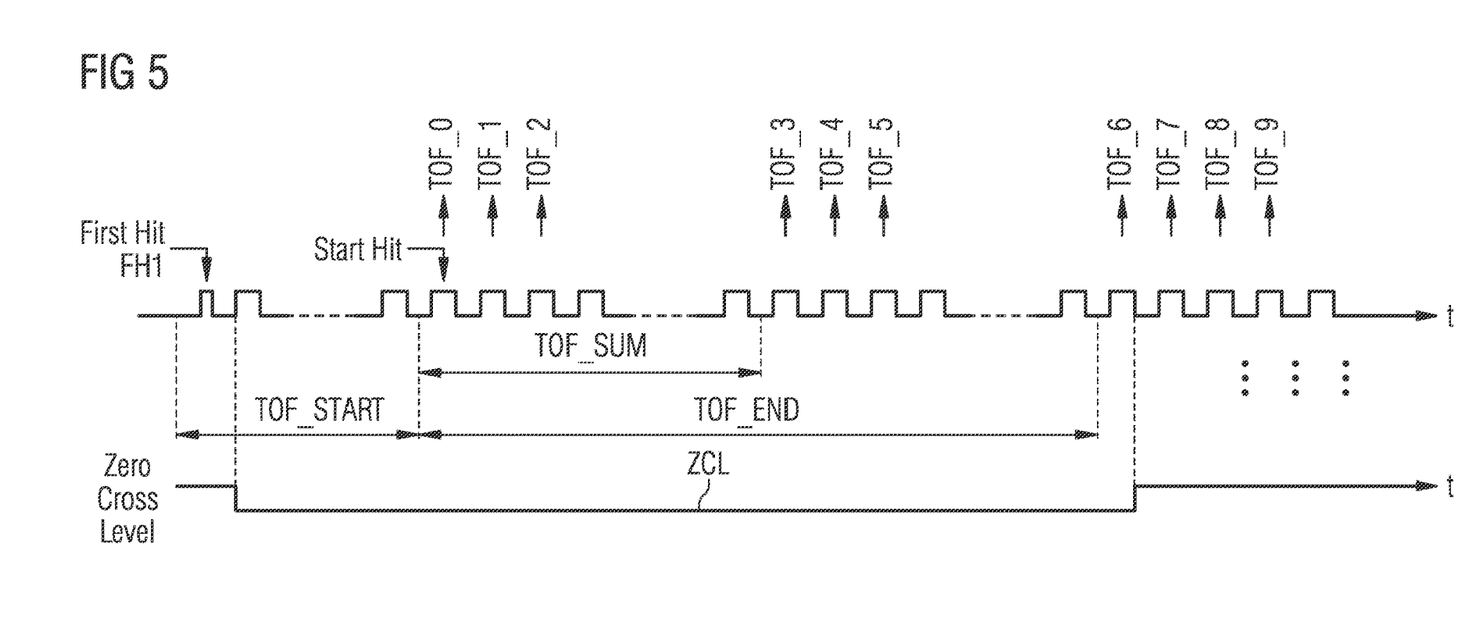
FIG. 5 shows an example sequence of timing signals.

FIG. 5 shows an example sequence of timing signals. The graph shown in the drawing shows an example of raw hits in more detail. The raw hits are the result of zero-crossing detections, e.g. which are occurring for one measurement direction such as upstream or downstream. Detection of the first hit triggers zero-crossing detection. This is indicated by a drop of the zero cross level ZCL after the trigger condition has been met, i.e. the trigger signal level has been reached. The further hits are numbered in chronological order using the second index J.

However, not all hits may be used to build the sequence of time-of-flight signals TOF. After the first hit has been detected further hits are not registered until a first time window TOF_START has lapsed. For the duration of a second time window TOF_SUM, further hits starting with a start hit are registered using the register block. In the embodiment indicated in the drawing three hits TOF_0, TOF_1, and TOF_2 are registered. Then three more hits TOF_3, TOF_4, and TOF_5 are written to the register block after a defined number of hits after the first hit, i.e. following the second time window TOF_SUM. Finally, after the phase shift PS (not shown) and after a third time window TOF_END has lapsed, four final hits TOF_6, TOF_7, TOF8, and TOF_9 are written into result registers. The phase shift can be determined from the stored time values in the result block.

Figure 6:
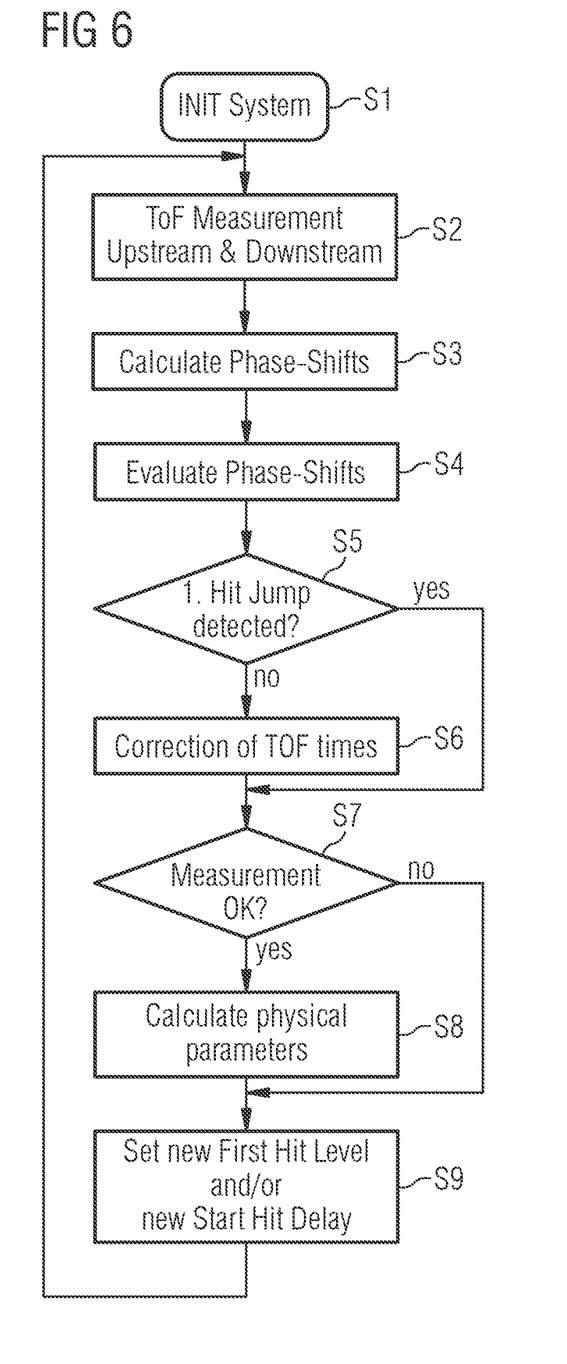
FIG. 6 shows an example flow diagram for time-of-flight detection.

FIG. 6 shows an example flow diagram for a time-of-flight detection. The proposed method can be implemented as software, e.g. firmware, and is executed by the processing unit PU. However, at least parts of the method can be executed on-chip the time-of-flight converter TOFC or by external means, such as a dedicated microprocessor or computer. Furthermore, it is possible to implement the method by hardware such as logical units and the like. Execution of the method is supported by the time-of-flight converter TOFC discussed above.

In a first step S1 the system, e.g. the time-of-flight converter TOFC, is initialized. This typically involves setting all parameters to initial values, deleting the registers of the register block and resetting the components of the time-of-flight converter such as the time reference generator RG, the timing block TB and the processing unit PU, for example.

In a next step S2 a time-of-flight measurement cycle is performed. For example, when the time-of-flight converter is used as an ultrasound flow meter, an upstream and a downstream measurement or a number of such measurements is performed. In a next step S3, the phase shift is determined in the received signal trains of the time-of-flight measurement cycles. The detected phase shift is evaluated in step S4 by comparing the detected phase shift with the predetermined phase shift PS which has been introduced in the transmitted signal trains, e.g. by means of the signal generator SG.

Step S5 involves a decision whether a first hit has been detected correctly. For example, due to external influences the first hit position may jump in time and eventually leads to false detection. The decision is made using the predetermined phase shift PS as reference marker, i.e. the detected first hit is compared with a predicted first hit as defined by its relative position in time with respect to the phase shift PS. The detected first hit corresponds to the first timing signal indicating the first time of arrival of the wave period being received first in time after the trigger condition has been met. The trigger condition may either be defined by the predetermined trigger signal level and/or the predetermined trigger delay time. In case the first hit and the predicted first hit have a same time of arrival, the method proceeds with step S7. In case the first hit and the predicted first hit have different times of arrival, the processing unit PU or software tries to correct the sequence of time-of-flight signals TOF by using the predicted first hit as new first hit. This is done in step S6.

In step S7 it is decided whether the correction of the time-of-flight signals has been successful. The measurement is considered successful when the assignment of wave periods of the received signal trains to respective wave periods of the first group using the detected phase shift as reference matches within a defined time margin. The comparison is considered as matching when each detected or considered received wave period has a matching wave period in the transmitted signal train within said margin. If this is the case, the method proceeds with step s8 and determines the physical parameter, e.g. a flow velocity, from the sequences of time-of-flight signals TOF of both first and second measurement cycles, e.g. for upstream and downstream measurements in case of an ultrasound flow measurement. Then detection according to the method may proceed with step s9 and the first hit level and/or trigger delay time are set for a new measurement cycle. Then, the procedure returns to step S2.

In case the first hit and predicted first hit have different times of arrival and correction of the sequence of time-of-flight signals using the predicted first hit is not possible a new measurement cycle is started by setting a new first hit level and/or a new trigger delay time in step S9. Setting of these levels involves adjusting the trigger condition such that the first hit corresponds to the wave period of the received signal train which is registered first in chronological order of reception.

Figure 7:
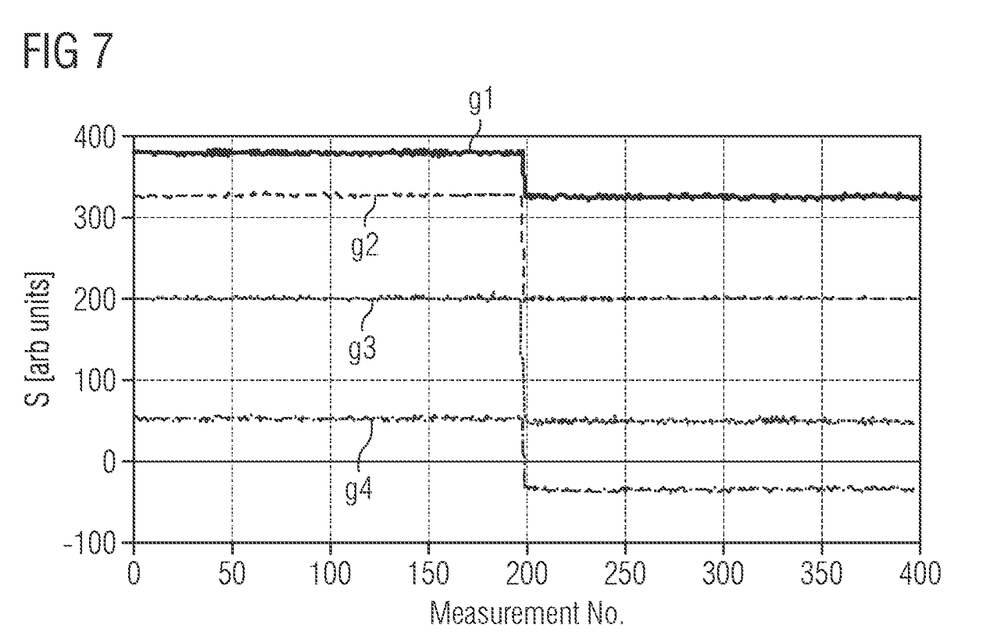
FIG. 7 shows an example jump of a first hit detected using the predetermined phase shift.

FIG. 7 shows an example jump of a first hit detected using the predetermined phase shift. The signals were measured with 500 KHz ultrasonic gas transducers. The graph depicts a signal level S in arbitrary units over a number of measurement cycles, counted by increasing numbers. In this example, this number ranges up to 400 measurement cycles. The predetermined phase shift PS relative to the post burst pulses FBG_BURST_POST has been calculated for four zero crossings.

The drawing shows the results of four calculated phase shift times from a transmitted signal train TS over 400 measurements (shown as graphs g1 to g4). The four times are calculated from one measurement. After half of the plotted time, i.e. at measurement number 200, a jump of the first hit level to an earlier period happens. In the graphs g1 to g4 shown in the drawing, jumps are visible as time shifts around measurement number 200. The individual graphs g1 to g4 correspond to different shifts.

When the time shifts or jumps are continuously checked as suggested in FIG. 6 in step S5, the time-of-flight converter TOFC can detect a jump of one or more periods and can then adapt the trigger condition accordingly, e.g. in step s9. The predetermined phase shift was calculated for 500 KHz ultrasonic gas transducers with a quarter of the period length phase shift.

The proposed method and time-of-flight converter can be used in ultrasonic flow controllers. In the industrial markets and power supply business, more advanced techniques are often needed for a secure time-of-flight measurement. Areas of application involve water metering or gas metering. For example, both the method and time-of-flight converter TOFC allow for low power flow meter solutions such as for domestic metering markets or other battery-based systems. Especially in the gas and fluid meter market, more advanced techniques are needed for a secure time-of-flight measurement as suggested. Such flow meters may find applications in heating systems.

While one aspect of the proposed concept is for ultrasonic flow measurement with the transit time method, also known as time-of-flight, it can also be used in other time-of-flight applications. These other applications involve optical distance measurements using an optical sensor or surface scanning. In these optical applications also a number of transmitted signal trains are employed as measurement signal. The timescale of the pulses, or transmitted wave periods in general, needs to be adapted to the temporal resolution of the time-of-flight converter, e.g. the time resolution of the time-to-digital converter.

Although the invention has been illustrated and described in detail by means of the preferred embodiment examples, the present invention is not restricted by the disclosed examples and other variations may be derived by the skilled person without exceeding the scope of protection of the invention.

The invention claimed is:

1. A method for detecting a time-of-flight signal, the method comprising:
   transmitting a signal train through a medium, wherein the signal train comprises a sequence of waves of a first group and of a second group, wherein the first and second groups are shifted in a time domain according to a predetermined phase shift, and wherein the phase shift is inserted between the first group and the second group such that the first group of waves is transmitted earlier in time than the second group of waves;
   receiving the signal train as a received signal train and as a function of time;
   detecting a phase shift in the received signal train;
   assigning wave periods of the received signal train to respective wave periods of the first group using the detected phase shift as a reference; and
   determining a sequence of time-of-flight signals from the sequence of waves of the first group and the assigned wave periods of the received signal train, respectively.

2. The method according to claim 1,
   wherein the wave periods of the signal train are registered with a first index, respectively,
   wherein first indices are representative of a chronological order of transmission of the wave periods, respectively,
   wherein the wave periods of the received signal train are registered with a second index, respectively,
   wherein second indices are representative of a chronological order of reception of the wave periods, respectively,
   wherein pairs of transmitted wave periods and received wave periods are created having first indices corresponding to second indices,
   wherein the sequence of time-of-flight signals is determined from the pairs, and
   wherein a physical parameter is calculated from the time-of-flight signals of the sequence of time-of-flight signals.

3. The method according to claim 2,
   wherein the sequence of time-of-flight signals is determined during a first measurement cycle,
   wherein at least another sequence of time-of-flight signals is determined during a second measurement cycle, and
   wherein the physical parameter is determined from the sequences of time-of-flight signals of both first and second measurement cycles.

4. The method according to claim 1,
   wherein a time reference signal is issued with transmitting the signal train,
   wherein timing signals are generated which are representative of a time of arrival of received wave periods, respectively,
   wherein generating the timing signals is triggered when a trigger condition is met, and
   wherein the sequence of time-of-flight signals is determined from the timing signals and with respect to the time reference signal.

5. The method according to claim 4, wherein the trigger condition is met when:
   a first received wave period has reached a predetermined trigger signal level, and/or
   a predetermined trigger delay time has lapsed.

6. The method according to claim 4,
   wherein the timing signals are generated as digital time stamps using time-to-digital conversion, and
   wherein the phase shift is detected in time domain by evaluating the digital time stamps.

7. The method according to claim 4,
   wherein a first timing signal is defined as a first time of arrival of a wave period being received first in time after the trigger condition has been met, denoted first hit,
   wherein a predicted first hit is determined from the detected phase shift,
   wherein a physical parameter from the sequence of time-of-flight signal is calculated when the first hit and predicted first hit have the same time of arrival,
   wherein the sequence of time-of-flight signals using the predicted first hit is corrected as first hit and/or a new measurement beginning with transmitting the signal train again is started when the first hit and predicted first hit have different times of arrival, and
   wherein the trigger condition such that the first hit corresponds to the wave period of the received signal train registered first in chronological order of reception is adjusted when the first hit and predicted first hit have different times of arrival.

8. The method according to claim 1, wherein the signal trains comprise wave periods of visible, infrared or UV light, or sound wave periods or ultrasound wave periods.

9. A time-of-flight converter comprising:
   a transmitter frontend with at least one output terminal connected to at least one transducer, the transmitter frontend configured to generate an output signal to drive the at least one transducer to transmit a signal train through a medium, wherein the signal train comprises a sequence of waves of a first group and of a second group, and wherein the first and second groups are shifted by an inserted predetermined phase shift in a time domain such that the first group of waves is transmitted earlier in time than the second group of waves;
   a timing register block with at least one input terminal configured to receive an input signal as a function of time; and
   a processor configured to:
      detect a phase shift in the input signal;
      assign wave periods of the input signal to respective wave periods of the first group using the detected phase shift as a reference; and
      determine a sequence of time-of-flight signals from the sequence of waves of the first group and the assigned wave periods of the received input signal, respectively.

10. The time-of-flight converter according to claim 9,
    wherein the transmitter frontend comprises a configurable signal generator configured to generate the output signal, and
    wherein the signal generator is configured to receive control signals to:
    adjust a waveform of the transmitted signal trains,
    adjust a number of wave periods of the first group of waves and/or the second group of waves, and
    insert the phase shift between the first group and the second group of waves.

11. The time-of-flight converter according to claim 9, wherein the transmitter frontend comprises:
    a time reference generator configured to issue a time reference signal; and a timing block configured to generate timing signals representative of a time of arrival of received wave periods, respectively, wherein generating the timing signals is triggered when a trigger condition is met, and wherein the processor is configured to determine the time-of-flight signals from the timing signals and with respect to the time reference signal.

12. The time-of-flight converter according to claim 9, further comprising:

a signal level detector configured to:
   monitor a signal level of received wave periods, and
   issue a trigger signal to trigger the timing block when a first received wave period has reached a predetermined trigger signal level; or
a timer configured to issue the trigger signal to trigger the timing block when a predetermined trigger delay time has lapsed.

13. An ultrasound flow meter comprising:
the time-of-flight converter according to claim 9,
wherein the at least one transducer is an ultrasound transducer.

14. An optical sensor device comprising:
the time-of-flight converter according to claim 9,
wherein the at least one transducer is an optical transducer.

* * * * *